United States Patent [19]

Chalin

[11] Patent Number: 5,865,452
[45] Date of Patent: Feb. 2, 1999

[54] STEERABLE SUSPENSION SYSTEM

[75] Inventor: Thomas N. Chalin, Garland, Tex.

[73] Assignee: Watson & Chalin Manufacturing, Inc., McKinney, Tex.

[21] Appl. No.: 811,848

[22] Filed: Mar. 5, 1997

[51] Int. Cl.[6] ................................................. B60G 1/00
[52] U.S. Cl. ........................... 280/124.125; 180/905
[58] Field of Search ........................... 280/124.125, 788; 180/905, 253

[56] References Cited

U.S. PATENT DOCUMENTS

| | | | |
|---|---|---|---|
| 1,890,766 | 12/1932 | Adams | 280/124.125 |
| 2,034,476 | 3/1936 | Lemay | 280/106.5 |
| 2,416,388 | 2/1947 | Hendrix | 267/14 |
| 2,902,290 | 9/1959 | Hausman | 280/96.2 |
| 3,694,001 | 9/1972 | McGee | 280/124 |
| 3,970,166 | 7/1976 | Sheppard | 180/163 |
| 4,500,112 | 2/1985 | Raidel | 280/693 |
| 4,693,486 | 9/1987 | Pierce et al. | 180/905 |
| 4,733,744 | 3/1988 | Glaze | 280/124.125 |
| 4,783,095 | 11/1988 | Rampini et al. | 280/672 |
| 5,505,481 | 4/1996 | Vandenberg et al. | 280/704 |

*Primary Examiner*—Kenneth R. Rice
*Attorney, Agent, or Firm*—Konneker & Smith

[57] ABSTRACT

An improved steerable suspension system provides light weight and ease of assembly. In a preferred embodiment, a steerable suspension system has a device attached to opposite ends of a tubular axle. The device includes a number of interconnected plates which cooperate to form an axle seat, and to which a king housing portion is attached.

19 Claims, 7 Drawing Sheets

STEERABLE SUSPENSION SYSTEM

BACKGROUND OF THE INVENTION

The present invention relates generally to suspension systems utilized on large trucks and tractor-trailer rigs and, in a preferred embodiment thereof, more particularly provides an improved steerable suspension system.

Steerable suspension systems utilized on large truck and tractor-trailer rigs typically include cast or forged axles with king pin housings integrally formed at opposite ends of the axles. In this manner, the spatial relationships between the axle and the king pin housings are fixed for particular suspension systems. However, this creates other problems that are not easily resolved.

As an example of the problems encountered with typical steerable suspension systems, the integrally formed axles and king pin housings tend to be heavy, due to constraints of the casting or forging processes.

As another example of the problems encountered with typical steerable suspension systems, the axle portion thereof is usually formed in an I-beam, or modified I-beam, shape. Such shapes may be easily forged or cast, but they do not efficiently utilize the material of which they are formed, and they do not present convenient surfaces for attachment of brackets, etc., thereto.

As yet another example, typical steerable suspension systems are generally inflexible in their design. If a different offset, or a different axle strength, a different axle length, a different king pin housing configuration, etc., is desired, a completely different casting or forging must be produced and inventoried. Brackets, etc., configured for attachment to a suspension system designed for one application may not be adaptable to a suspension system designed for another application.

From the foregoing, it can be seen that it would be quite desirable to provide an improved steerable suspension system which is flexible in design, reduces weight, is easily assembled, and reduces inventory cost. It is accordingly an object of the present invention to provide such a steerable suspension system. Other objects, benefits, and features of the present invention will become apparent upon careful consideration of the detailed description and accompanying drawings of an embodiment thereof hereinbelow.

SUMMARY OF THE INVENTION

In carrying out the principles of the present invention, in accordance with an embodiment thereof, an improved steerable suspension system is provided which is a combination of a generally tubular axle and a device attached at each opposite end of the axle, utilization of which enables weight to be eliminated, reduces fasteners required for assembly, requires minimal maintenance, is compact in design, and, due to flexibility of the system design, reduces inventory cost.

In broad terms, an improved steerable suspension system is provided by the present invention. The suspension system includes an axle and two devices. The axle is generally tubular and has opposite ends. One of the devices is attached to each of the axle opposite ends. Each device includes a king pin housing configured for receipt of a king pin therein, and an axle seat complementarily shaped relative to the axle.

The device also includes a plurality of interconnected plates. The plates are attached to the king pin housing and the axle. The plates include side plates and an inner plate, the inner plate having a profile formed thereon. The profile is complementarily shaped relative to the axle. The side plates and the profile cooperate to form the axle seat.

The plurality of plates further includes an outer plate outwardly overlying one of the axle opposite ends, and a top plate attached to the side plates. The suspension system also includes a partial upper arm bracket attached to the top plate, the partial upper arm bracket including an opening aligned with an opening formed through the inner plate, and a partial lower arm bracket attached to the axle, the partial lower arm bracket also including an opening aligned with another opening formed through the inner plate.

Another suspension system is provided by the present invention. The suspension system includes a king pin housing having an opening formed therethrough for receipt of a king pin therein, a generally tubular axle, and an axle seat as part of the axle. The axle seat is complementarily shaped relative to the axle, and is integrally formed with the king pin housing.

In another aspect of the present invention, a steerable suspension system is provided. The suspension system includes a king pin housing, a combined axle and axle seat, an airspring bracket, an airspring, a partial lower arm bracket, and a partial upper arm bracket.

The king pin housing has an opening formed therethrough for receipt of a king pin therein. The axle is generally tubular and has opposite ends. The axle seat is complementarily shaped relative to the axle and is attached thereto. The axle seat is integrally formed with the king pin housing.

The airspring bracket is attached to the axle. It has a generally planar plate extending generally parallel to the axle and an attachment portion attached to the plate. The attachment portion is complementarily shaped relative to the axle and is attached thereto. The airspring is attached to the airspring bracket.

The partial lower arm bracket is attached to the axle. It has a first portion extending generally orthogonal to the axle and has an opening formed therethrough for receipt of a first fastener therein. A second portion is attached to the first portion. It is complementarily shaped relative to the axle and is attached thereto.

The partial upper arm bracket is attached to the king pin housing and axle seat. It has a first portion extending generally orthogonal to the axle and has an opening formed therethrough for receipt of a second fastener therein. A second portion is attached to the first portion and is complementarily shaped relative to the king pin housing and axle seat, and is attached thereto.

In yet another aspect of the present invention, a device is provided for use with a steerable suspension system having a king pin and an axle extending generally transversely relative to the king pin. The device includes a king pin housing having a first opening formed therethrough, the first opening being configured for receipt of the king pin therein, and an axle seat integrally formed with the king pin housing and having a portion thereof complementarily shaped relative to the axle.

DETAILED DESCRIPTION

Figure 1A:
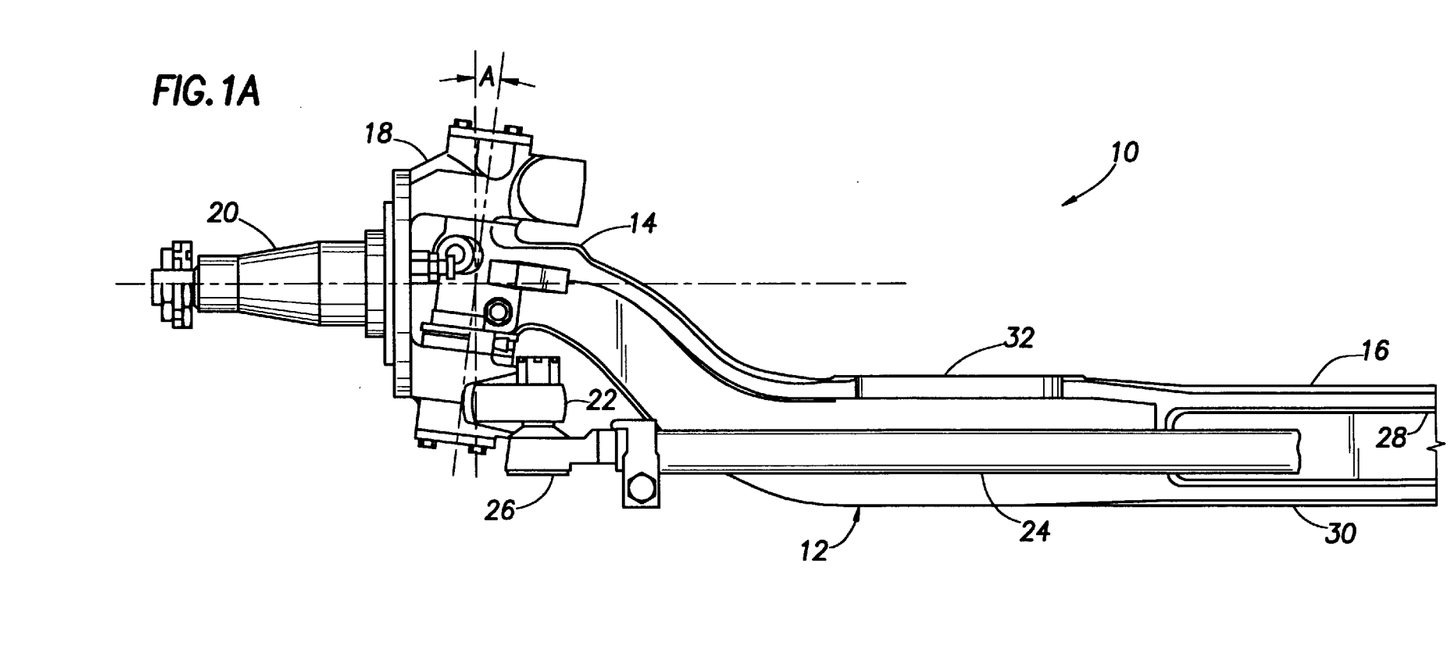
FIGS. 1A–1B are front and top elevational views, respectively, of a steerable axle system.
Figure 1B:
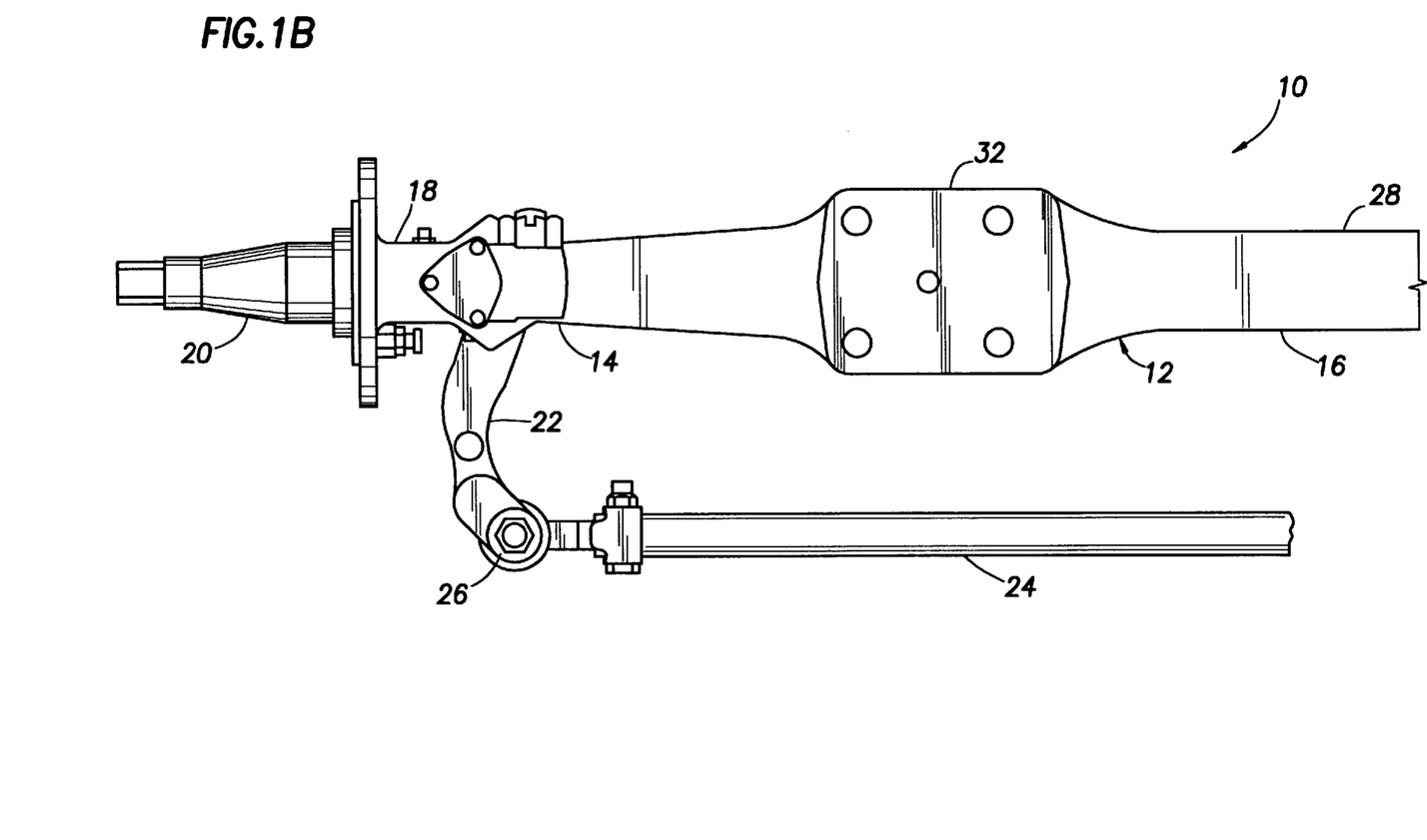

Illustrated in FIGS. 1A–1B is a steerable axle system 10. Only one side of the axle system 10 is shown, as the other side is substantially a mirror image thereof. The axle system 10 includes a cast or forged member 12 which has an integrally formed king pin housing portion 14 and axle portion 16. The king pin housing portion 14 has a king pin (not visible in FIGS. 1A & 1B) received therein in a conventional manner.

The king pin connects to a spindle yoke 18 above and below the king pin housing portion 14. A generally horizontally extending spindle 20 extends outwardly from the spindle yoke 18. The spindle 20 provides for attachment of wheel bearings, wheel hub, etc. (not shown), thereto in a conventional manner. The spindle yoke 18 and spindle 20 rotate about the king pin, thereby also permitting a wheel (not shown) attached to the spindle to rotate about the king pin, and allowing a vehicle on which the suspension system is installed to change its direction of travel.

A control arm 22 extends generally horizontally from the lower portion of the spindle yoke 18 and generally orthogonal to the spindle 20. A tie rod 24 is pivotably attached to the control arm 22 by means of a tie rod end or ball joint 26. As shown in FIGS. 1A & 1B, the tie rod 24 is disposed generally orthogonal to the control arm 22 and generally parallel to the axle portion 16, the tie rod extending inwardly from the control arm. In a conventional manner, rotation of the spindle yoke 18 relative to the king pin housing 14 is, thus, controllable by lateral displacement of the tie rod 24.

The axle portion 16 has a generally I-shaped cross-section. Upper and lower generally horizontally disposed flanges 28, 30, respectively, provide resistance to longitudinally directed bending moments produced, for example, by the weight of the vehicle supported by the axle system 10. It will be readily apparent to one of ordinary skill in the art that generally I-shaped cross-sections are not well suited for resistance to torsion in the direction of a beam's axis.

A generally horizontally disposed plate 32 is formed on the axle portion 16 adjacent the upper flange 28. The plate provides a mounting platform for an axle seat and airspring (not shown). Additionally, note that surfaces of the axle portion 16 are generally either horizontally or vertically disposed. Thus, if it is desired to mount a bracket, airspring, etc., at an inclination other than horizontal or vertical, the bracket, etc., must be fabricated and inventoried especially for that inclination, or a different member 12 having appropriately inclined surfaces must be fabricated and inventoried.

Figure 2:
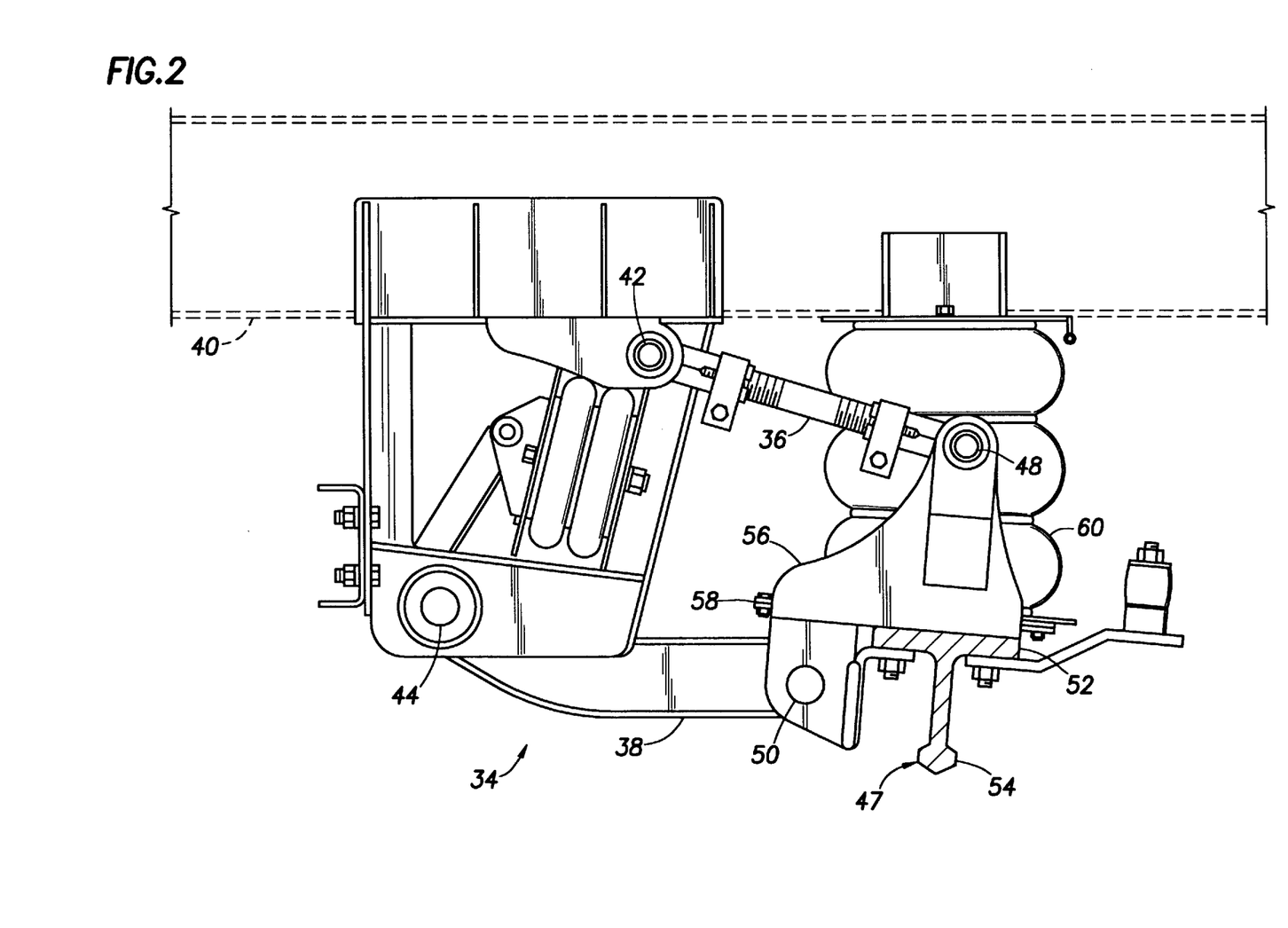
FIG. 2 is a side elevational view of a typical steerable suspension system.

Referring additionally now to FIG. 2, a typical steerable suspension system 34 is shown from a side view thereof, with a king pin housing, spindle, and other outer portions thereof removed for illustrative clarity. The suspension system 34 is of the type known to those skilled in the art as a modified parallelogram, upper and lower arms or links 36, 38, respectively, being pivotably attached to a vehicle frame 40 at fasteners 42, 44, respectively, and to an axle portion 47 of the suspension system at fasteners 48, 50, respectively.

The fasteners or pivot points 42, 44, 48, 50 are spaced apart so that, as the axle portion 47 is displaced vertically relative to the frame 40, the axle portion is rotated somewhat about a transverse axis. Other somewhat similar suspension systems are known as "four-link" suspension systems.

The axle portion 47 has a generally I-shaped cross-section, except that its upper flange 52 is substantially wider than its lower flange 54 at a mounting location for an airspring 60 and axle seat 56. The axle portion 47 has a king pin housing (not shown) integrally formed at each of its opposite ends, similar to the king pin housing portion 14 of the member 12 shown in FIGS. 1A & 1B.

The fasteners 48, 50 are secured in their spatial relationships to the axle portion 47 by means of the axle seat 56 attached to the axle portion. Note that, if it is desired to change the spatial relationships of the fasteners 48, 50 to the axle portion 47 by, for example, rotating the axle seat 56 relative to the axle portion, a different bracket or axle portion would be required to be fabricated and inventoried.

A bracket 58 is attached to the axle seat 56. The bracket 58 is utilized to mount an air bag or airspring 60 to the axle seat 56.

Figures 3, 4:
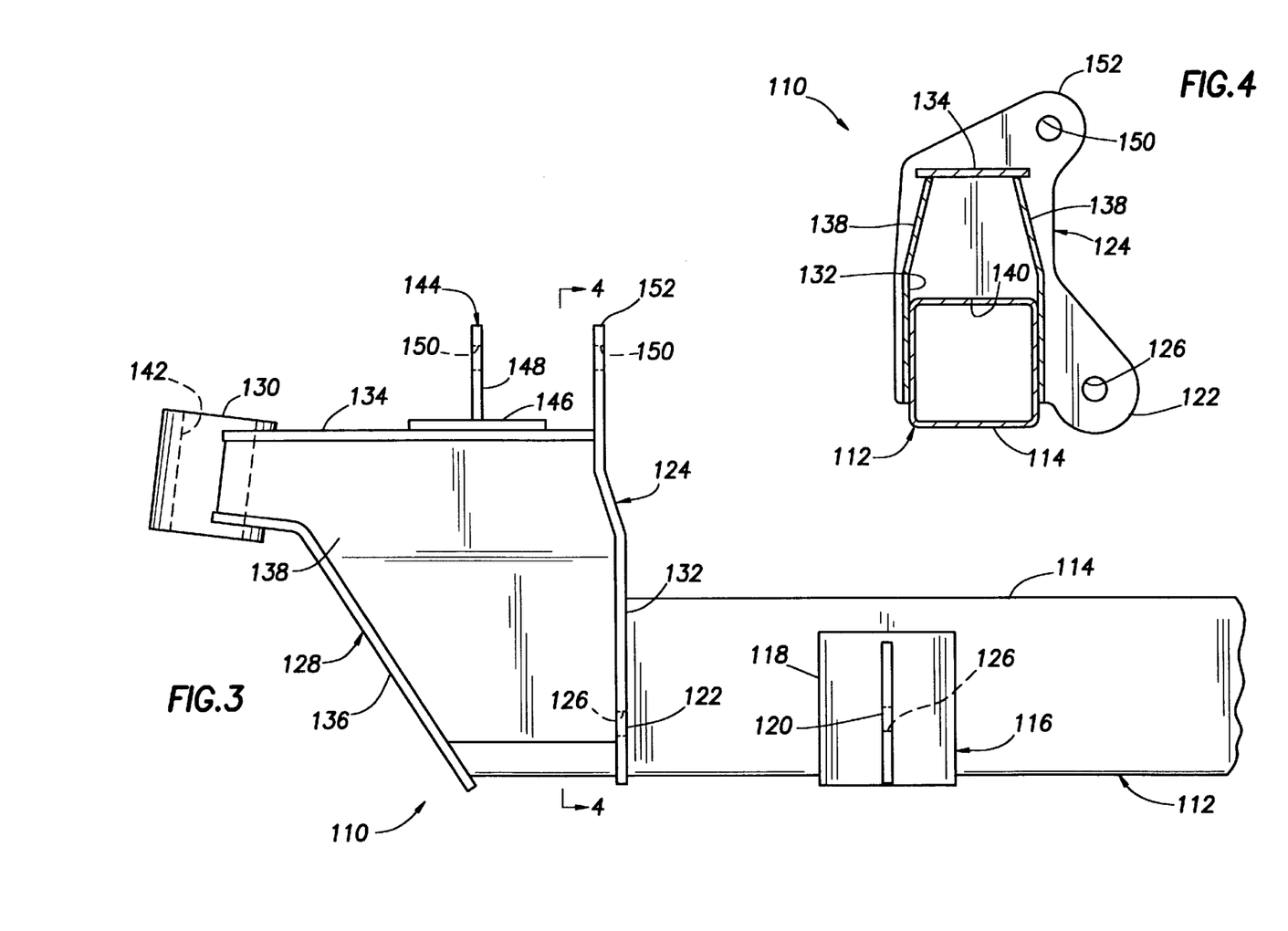
FIG. 3 is a front elevational view of a steerable axle system embodying principles of the present invention.
FIG. 4 is a cross-sectional view of the steerable axle system of FIG. 3, taken along line 4—4.

Referring additionally now to FIGS. 3 & 4, an improved steerable axle system 110 embodying principles of the present invention is representatively illustrated. In the following description of the axle system 110 and other apparatus, directional terms, such as "upper", "lower", "above", "below", etc., are used for convenience in referring to elements of the axle system as depicted in the accompanying figures. It is to be understood, however, that the elements may be otherwise oriented, and the axle system 110 may be utilized in other orientations, without departing from the principles of the present invention.

The axle system 110 includes a generally tubular and laterally extending axle tube 112. The axle tube 112 is generally square-shaped, but it is to be understood that other shapes may be utilized for the axle without departing from the principles of the present invention. Only one end of the axle tube 112, is representatively illustrated in FIG. 3, the other end being similar to the one depicted.

It will be readily appreciated by one skilled in the art that the tubular axle 112 is more efficient in resisting torsion about its axis, as compared to the I-shaped axle portions 16, 47 previously described. Due to this increase in efficiency, the axle 112 may use less material and, therefore, have less weight. Another benefit of the axle 112 is that, where it is desired to increase the strength of the axle, its wall thickness may be increased without affecting its outer side surface 114. Thus, the axle 112 may be strengthened without requiring corresponding changes to brackets, etc., attached thereto.

A partial lower arm bracket 116 is attached to the axle 112 by, for example, welding an attachment plate portion 118 thereof to the outer side surface 114. The attachment plate portion 118 may be complementarily shaped relative to the outer side surface 114 of the axle 112. Other methods of attaching the bracket 116 may be utilized, for example, U-bolts, clamps, etc., without departing from the principles of the present invention. The bracket 116 has a portion 120 extending outwardly (i.e., downwardly and forwardly as viewed in FIG. 3, similar to portion 122 shown in FIG. 4) from the attachment portion 118. The portion 120 has an opening 126 formed transversely therethrough for receipt of a fastener, such as fastener 50, therein. In this manner, a lower arm, such as lower arm 38, may be pivotably attached to the axle 112 in the axle system 110.

Proximate each of its ends, the axle 112 is attached to a device 128. The device 128 includes a king pin housing portion 130 and an axle seat portion 132. The king pin housing portion 130 and axle seat portion 132 are combined by a unique construction and arrangement of a top plate 134, an outer plate 136, opposing side plates 138, and the inner plate 124. The plates 124, 134, 136, 138 and the king pin housing portion 130 are attached to each other as shown by conventional methods, such as by welding, to thereby provide a generally hollow box-like assembly, which is substantially lighter in weight than a comparable casting or forging, but which is generally equivalent in strength. Inner side surfaces of the side plates 138 are complementarily shaped relative to the outer side surface 114 of the axle 112, and the inner plate 124 has a profile 140 formed therein, which is also complementarily shaped relative to the outer side surface 114, thereby forming the internal axle seat 132. The outer plate 136 overlies an outer end of the axle 112, and thereby forms a closure over the end of the axle. Each of the plates 124, 136, 138 is attached to the axle 112 as shown by conventional methods, such as by welding the plates to the axle, but it is to be understood that the axle seat portion 132 may be otherwise attached to the axle, for example, by U-bolts, clamps, etc., without departing from the principles of the present invention.

The king pin housing portion 130 has an opening 142 formed therethrough. A conventional king pin (not shown) may be installed within the opening 142 and secured therein utilizing a retainer bolt (not shown) or other conventional fastening means. A spindle yoke (such as spindle yoke 18), spindle (such as spindle 20), and control arm (such as control arm 22) may be pivotably attached to the king pin, similar to the manner in which these elements are attached to the king pin housing portion 14 of the axle system 10 described above (see FIGS. 1A–1B).

Since the device 128 is separate from the axle 112 before being attached thereto, the axle may be changed as desired, such as by changing its length, wall thickness, etc., without requiring any changes to the device. Thus, only one device 128 need be inventoried for use with a variety of differently configured axles 112. Similarly, if it is desired to change the device 128, for example, to provide a strengthened device for a particular application, change its configuration, etc., the changed device may still be attached to the same axle 112 without requiring any changes thereto.

A partial upper arm bracket 144 is attached to the device 128 by, for example, welding an attachment portion 146 thereof to the top plate 134. Other methods of attaching the bracket 144 may be utilized, for example, U-bolts, clamps, etc., without departing from the principles of the present invention. The bracket 144 has a portion 148 extending outwardly (i.e., upwardly and forwardly as viewed in FIG. 3, similar to portion 152 shown in FIG. 4) from the attachment portion 146. The portion 148 has an opening 150 formed transversely therethrough for receipt of a fastener, such as fastener 48, therein. In this manner, an upper arm, such as upper arm 36, may be pivotably attached to the device 128 in the axle system 110. Thus, the axle system 110 may be utilized in a parallelogram, modified parallelogram, four-link, etc., type of suspension (see FIG. 6), but it is to be understood that, properly modified, the axle system 110 may be utilized in other types of suspensions without departing from the principles of the present invention. Of course, modifications may easily be made to the axle system 110, such as those modifications that would be obvious to one of ordinary skill in the art, for example, to adapt the axle system 110 for use in another type of suspension, differently configure the brackets 144, 116, etc., without departing from the principles of the present invention.

Figure 5:
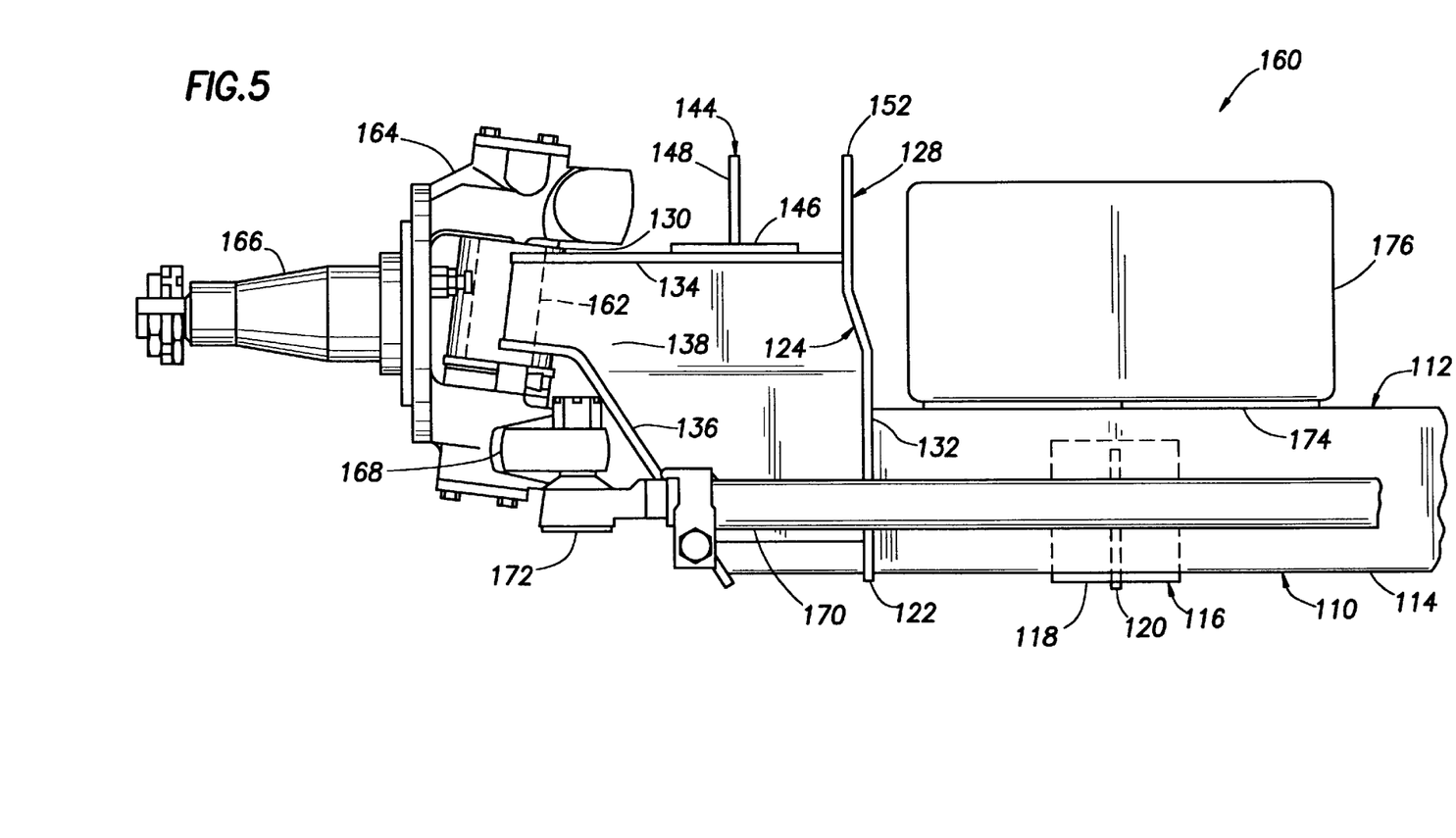
FIG. 5 is a rear elevational view of the steerable axle system of FIG. 3.

Referring additionally now to FIG. 5, an improved steerable axle system 160, which utilizes the system 110, is representatively illustrated, the steerable axle system embodying principles of the present invention. Only one side of the axle system 160 is shown, as the other side is substantially a mirror image thereof. The axle system 160 includes the device 128 which has the combined king pin housing portion 130 and axle seat 132. The king pin housing portion 130 has a king pin 162 received in its opening 142 (see FIG. 3) in a conventional manner.

The king pin 162 is pivotably secured to a spindle yoke 164 above and below the king pin housing portion 130. A generally horizontally extending spindle 166 extends outwardly from the spindle yoke 164. The spindle 166 provides for attachment of wheel bearings, wheel hub, etc. (not shown), thereto in a conventional manner. The spindle yoke 164 and spindle 166 rotate about the king pin 162, thereby also permitting a wheel (not shown) attached to the spindle to rotate about the king pin and allowing a vehicle on which the steerable axle system 160 is installed to change its direction of travel.

A control arm 168 extends generally horizontally from the lower portion of the spindle yoke 164 and generally orthogonal to the spindle 166. A tie rod 170 is pivotably attached to the control arm 168 by means of a tie rod end or ball joint 172. As shown in FIG. 5, the tie rod 170 is disposed generally orthogonal to the control arm 168 and generally parallel to the axle 112, the tie rod extending inwardly from the control arm. In a conventional manner, rotation of the spindle yoke 164 relative to the king pin housing 130 is, thus, controllable by lateral displacement of the tie rod 170.

An airspring mounting bracket 174 is attached to the axle 112 by, for example, welding to the outer side surface 114. Other methods of attaching the bracket 174 may be utilized, for example, U-bolts, clamps, etc., without departing from the principles of the present invention. The bracket 174 permits an air bag or airspring 176 to be mounted thereto. Note that the airspring 176 may conveniently be otherwise positioned relative to the axle 112 by merely attaching the bracket 174 to the axle in an alternate location, without requiring changes to the axle.

Figure 6:
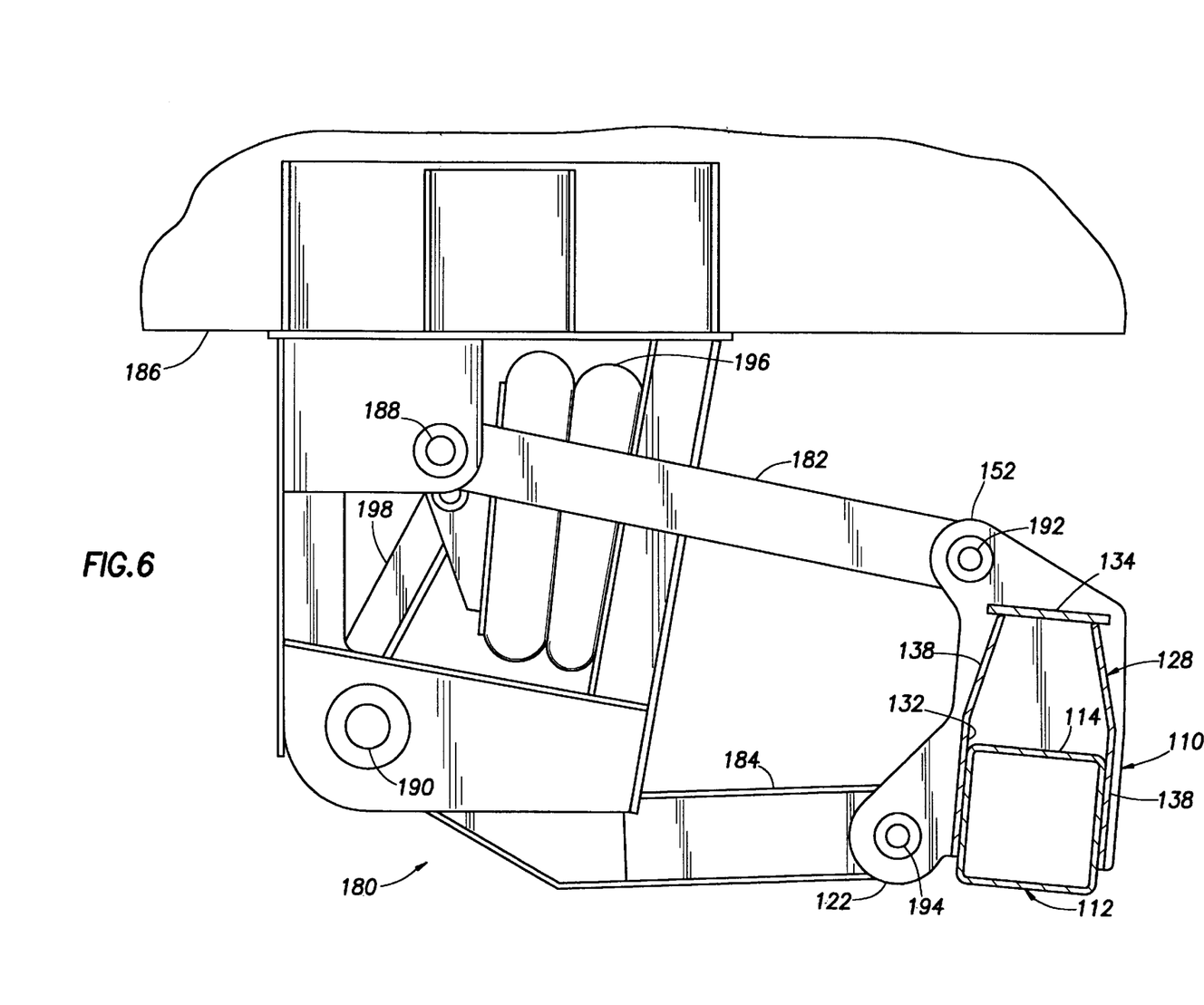
FIG. 6 is a side elevational view of a steerable suspension system embodying principles of the present invention, the suspension system incorporating the steerable axle system of FIG. 3.

Referring additionally now to FIG. 6, a steerable suspension system 180 is shown from a side view thereof, the steerable suspension system embodying principles of the present invention. The steerable axle system 160 shown in FIG. 5 is utilized in the steerable suspension system 180, however, the device 128, spindle yoke 164, and other outer portions thereof are removed for illustrative clarity.

The suspension system 180 is of the type known to those skilled in the art as a parallelogram, upper and lower arms or links 182, 184, respectively, being pivotably attached to a vehicle frame 186 at fasteners 188, 190, respectively, and to the steerable axle system 110 at fasteners 192, 194, respectively. The fasteners or pivot points 188, 190, 192, 194 are spaced apart so that, as the axle system 110 is displaced vertically relative to the frame 186, the axle 112 does not rotate about its transverse axis. Note that the fastener 192 extends through the aligned openings 150 of the portions 148, 152, and that the fastener 194 extends through the aligned openings 126 of the portions 120, 122. Of course, the suspension system 180 may be configured as a modified parallelogram or other suspension system, wherein the axle 110 does rotate about its transverse axis, however, the applicant prefers that the axle caster not change appreciably through its working range in that case.

If desired, and in order to provide the ability to raise the axle system 110 relative to the frame 186, an air bag 196 may be positioned between the frame 186 and an upwardly extending portion 198 of the lower arm 184. Inflation of the air bag 196 will cause the lower arm 184 to rotate counterclockwise as viewed in FIG. 6, thereby raising the axle system 110. Note that the airspring 176 (see FIG. 5) is not shown in FIG. 6 for illustrative clarity. However, when the axle system 110 is utilized in the system 180, the airspring 176 is attached to the frame 186 in a conventional manner, such as by attaching the airspring to a bracket fastened to the frame 186 in a manner similar to that shown in FIG. 2, and the airspring 176 would be exhausted or vented when the air bag 196 is inflated to raise the axle system 110.

Figure 7:
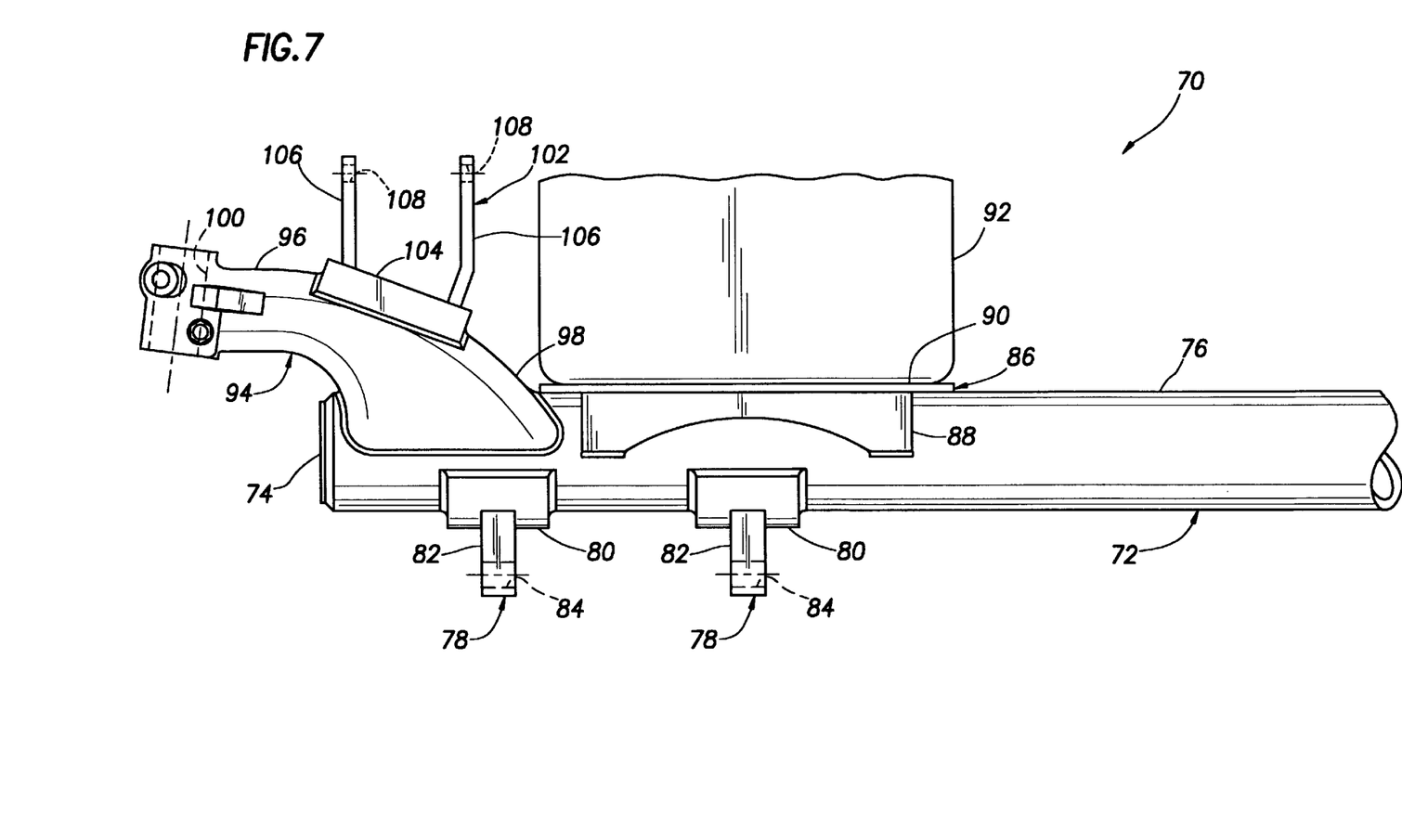
FIG. 7 is a front elevational view of another steerable axle system embodying principles of the present invention.

Referring additionally now to FIG. 7, an improved steerable axle system 70 embodying principles of the present invention is representatively illustrated. In the following description of the axle system 70 and other apparatus, directional terms, such as "upper", "lower", "above", "below", etc., are used for convenience in referring to elements of the suspension system as depicted in the accompanying figure. It is to be understood, however, that the elements may be otherwise oriented, and the axle system 70 may be utilized in other orientations, without departing from the principles of the present invention.

The axle system 70 includes a generally tubular and laterally extending axle 72. The axde 72 is cylindrically-shaped, but it is to be understood that other shapes may be utilized for the axle without departing from the principles of the present invention. Only one end of the axle 72 is representatively illustrated in FIG. 7, the other end being similar to the one depicted.

It will be readily appreciated by one skilled in the art that the tubular axle 72 is more efficient in resisting torsion about its axis, as compared to the I-shaped axle portions 16, 47 previously described. Due to this increase in efficiency, the axle 72 may use less material and, therefore, have less weight. Another benefit of the axle 72 is that, where it is desired to increase the strength of the axle, its wall thickness may be increased without affecting its outer side surface 76. Thus, the axle 72 may be strengthened without requiring corresponding changes to brackets, etc., attached thereto and without requiring such changed brackets, etc., to be inventoried. Yet another benefit of the tubular axle 72 is that the orientation of brackets, etc., attached thereto may be changed, for example, by rotating or displacing the brackets, etc., about or along the axle's axis, also without requiring corresponding changes to the brackets, etc., and without requiring such changed brackets, etc., to be inventoried.

A disc-shaped end cap 74 is attached to the end of the axle 72 to prevent entry of moisture, debris, etc., thereinto. As shown in FIG. 7, the end cap 74 is welded to the axle 72, but other methods of attaching the end cap may be used, such as threadedly installing the end cap in or onto the axle end.

Brackets 78 are attached to the axle 72 by, for example, welding complementarily shaped portions 80 thereof to the outer side surface 76. Other methods of attaching the brackets 78 may be utilized, for example, U-bolts, clamps, etc., without departing from the principles of the present invention. Note that the brackets 78 may be attached at other angular and axial positions relative to the axle 72 without requiring any changes to the brackets or axle.

Each of the brackets 78 has a portion 82 extending outwardly (i.e., downwardly and forwardly as viewed in FIG. 7) from the complementarily shaped portion 80. The portion 82 has an opening 84 formed transversely therethrough for receipt of a fastener, such as fastener 50, therein. In this manner, a lower arm, such as lower arm 38, may be pivotably attached to the axle 72 in the axle system 70.

An airspring mounting bracket 86 is attached to the axle 72 by, for example, welding a complementarily shaped portion 88 thereof to the outer side surface 76. Other methods of attaching the bracket 86 may be utilized, for example, U-bolts, clamps, etc., without departing from the principles of the present invention. Note that the bracket 86 may be attached at other angular and axial positions relative to the axle 72 without requiring any changes to the bracket or axle.

The bracket 86 has a planar portion 90 attached above the complementarily shaped portion 88. The portion 90 permits an air bag or airspring 92 to be mounted thereto.

Proximate each of its ends, the axle 72 is attached to a device 94. The device 94 includes a king pin housing portion 96 and an axle seat portion 98. The king pin housing portion 96 and axle seat portion 98 are integrally formed by conventional methods, such as casting, forging, etc.

The king pin housing portion 96 is similar to the king pin housing portion 14 of the axle system 10. It has an opening 100 formed therethrough. A conventional king pin (not shown) may be installed within the opening 100, and a spindle yoke (such as spindle yoke 18), spindle (such as spindle 20), and control arm (such as control arm 22) may be pivotably attached thereto, similar to the manner in which these elements are attached to the king pin housing portion 14 of the axle system 10 described above.

The axle seat portion 98 is complementarily shaped relative to the outer side surface 76 of the axle 72. As shown in FIG. 7, the axle seat portion 98 is attached to the axle 72 by being welded thereto, but it is to be understood that the axle seat portion may be otherwise attached to the axle, for example, by U-bolts, clamps, etc., without departing from the principles of the present invention. Note that the axle seat 98 and axle 72 permit the device 94 to be mounted to the axle in a variety of axial and angular positions without requiring changes to the axle or device. Additionally, since the device 94 is separate from the axle 72 before being attached thereto, the axle may be changed as desired, such as by changing its length, wall thickness, etc., without requiring any changes to the device. Thus, only one device 94 need be inventoried for use with a variety of differently configured axles 72. Similarly, if it is desired to change the device 94, for example, to provide a strengthened device for a particular application, change its offset, etc., the changed device may still be attached to the same axle 72 without requiring any changes thereto.

A bracket 102 is attached to the device 94 by, for example, welding a complementarily shaped portion 104 thereof to an upper side of the device. Other methods of attaching the bracket 102 may be utilized, for example, U-bolts, clamps, etc., without departing from the principles of the present invention. Alternatively, the bracket 102 may be integrally formed as a portion of the device 94. Note that the bracket 102 may be attached at other angular and axial positions relative to the device 94 without requiring any changes to the bracket or device.

The bracket 102 has two portions 106 extending outwardly (i.e., upwardly and forwardly as viewed in FIG. 7) from the complementarily shaped portion 104. The portions 106 have openings 108 formed transversely therethrough for receipt of a fastener, such as fastener 48, therein. In this manner, an upper arm, such as upper arm 36, may be pivotably attached to the device 94 in the axle system 70. Thus, the axle system 70 may be utilized in a parallelogram, or modified parallelogram, type of suspension, such as suspension system 34, but it is to be understood that, properly modified, the axle system 70 may be utilized in other types of suspensions without departing from the principles of the present invention. If utilized in a suspension such as that depicted in FIG. 2, the axle system 70 would replace the member 47, axle seat 56, bracket 58, and airspring 60. Of course, modifications may easily be made to the axle system 70, such as those modifications that would be obvious to one of ordinary skill in the art, for example, to adapt the axle system 70 for use in another type of suspension, differently configure the brackets 78, 86, 102, etc., without departing from the principles of the present invention.

Other modifications, substitutions, additions, etc., may be made to the axle systems 70, 110 and/or suspension system 180, which would be obvious to one of ordinary skill in the art, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. An improved steerable suspension system, comprising:
   a king pin housing having an opening formed therethrough for receipt of a king pin therein;
   a generally tubular axle; and
   an axle seat attached to said axle, said axle seat being complementarily shaped relative to said axle, and said axle seat being integrally formed with said king pin housing.

2. The steerable suspension system according to claim 1, wherein said axle has opposite ends, and further comprising an end cap attached to one of said opposite ends.

3. The steerable suspension system according to claim 1, further comprising an airspring bracket attached to said axle.

4. The steerable suspension system according to claim 3, wherein said airspring bracket has a generally planar plate extending generally parallel to said axle and an attachment portion attached to said plate, said attachment portion being complementarily shaped relative to said axle and being attached thereto.

5. The steerable suspension system according to claim 3, further comprising an airspring attached to said airspring bracket.

6. The steerable suspension system according to claim 1, further comprising a partial lower arm bracket attached to said axle.

7. The steerable suspension system according to claim 6, wherein said partial lower arm bracket has a first portion extending generally orthogonal to said axle and having an opening formed therethrough for receipt of a fastener therein, and a second portion attached to said first portion, said second portion being complementarily shaped relative to said axle and being attached thereto.

8. The steerable suspension system according to claim 1, further comprising an upper arm bracket attached to said axle seat and axle.

9. The steerable suspension system according to claim 8, wherein said upper arm bracket has a first portion extending generally orthogonal to said axle and having an opening formed therethrough for receipt of a fastener therein, and a second portion attached to said first portion, said second portion being complementarily shaped relative to said king pin housing and said axle seat and being attached thereto.

10. A steerable axle system, comprising:
    a king pin housing having an opening formed therethrough for receipt of a king pin therein;
    a generally tubular axle having opposite ends;
    an axle seat attached to said axle, said axle seat being complementarily shaped relative to said axle;
    an airspring bracket attached to said axle; said airspring bracket having a generally planar plate extending generally parallel to said axle and an attachment portion attached to said plate, said attachment portion being complementarily shaped relative to said axle and being attached thereto;
    an airspring attached to said airspring bracket;
    a partial lower arm bracket attached to said axle, said partial lower arm bracket having a first portion extending generally orthogonal to said axle and having an opening formed therethrough for receipt of a first fastener therein, and a second portion attached to said first portion, said second portion being complementarily shaped relative to said axle and being attached thereto; and
    an upper arm bracket attached to said king pin housing and said axle seat, said upper arm bracket having a first portion extending generally orthogonal to said axle and having an opening formed therethrough for receipt of a second fastener therein, and a second portion attached to said first portion, said second portion being complementarily shaped relative to said king pin housing and said axle seat and being attached thereto.

11. The steerable axle system according to claim 10, wherein said axle is generally cylindrically shaped.

12. The steerable axle system according to claim 10, wherein said axle seat is integrally formed with said king pin housing.

13. For use with a steerable suspension system having a king pin and an axle extending generally transversely relative to the king pin, a device comprising:
    a king pin housing having a first opening formed therethrough, said first opening being configured for receipt of the king pin therein; and
    an axle seat, said axle seat being integrally formed with said king pin housing and having a portion thereof complementarily shaped relative to the axle.

14. The device according to claim 13, further comprising an upper arm bracket attached to said king pin housing and said axle seat.

15. The device according to claim 14, wherein said upper arm bracket has a first portion having a second opening formed therethrough for receipt of a fastener therein, and a second portion attached to said first portion, said second portion being complementarily shaped relative to said integrally formed king pin housing and axle seat and being attached thereto.

16. A steerable suspension system, comprising:
    a generally tubular axle having opposite ends; and
    a device attached to each of said axle opposite ends, said device including a king pin housing configured for receipt of a king pin therein, and an axle seat complementarily shaped relative to said axle, said king pin housing and said axle seat being integrally formed.

17. A steerable suspension system, comprising:
    a generally tubular axle having opposite ends; and
    a device attached to each of said axle opposite ends, said device including a king pin housing configured for receipt of a king pin therein, an axle seat complementary shaped relative to said axle, and a plurality of interconnected plates, said plates being attached to said king pin housing and said axle.

18. The steerable suspension system according to claim 17, wherein said plurality of plates includes first and second side plates and an inner plate, said inner plate having a profile formed thereon, said profile being complementarily shaped relative to said axle, and said first and second side plates and said profile cooperating to form said axle seat.

19. The steerable suspension system according to claim 18, wherein said plurality of plates further includes an outer plate outwardly overlying one of said axle opposite ends, and a top plate attached to said first and second side plates, and further comprising a partial upper arm bracket attached to said top plate, said partial upper arm bracket including a first opening, said first opening being aligned with a second opening formed through said inner plate, and a partial lower arm bracket attached to said axle, said partial lower arm bracket including a third opening, said third opening being aligned with a fourth opening formed through said inner plate.

\* \* \* \* \*

(12) REEXAMINATION CERTIFICATE (4282nd)

United States Patent
Chalin (10) Number: US 5,865,452 C1
(45) Certificate Issued: Feb. 27, 2001

(54) STEERABLE SUSPENSION SYSTEM (75) Inventor: Thomas N. Chalin, Garland, TX (US)

(73) Assignee: Watson & Chalin Manufacturing, Inc., McKinney, TX (US)

Reexamination Request:
No. 90/005,577, Dec. 1, 1999

Reexamination Certificate for:
Patent No.: 5,865,452
Issued: Feb. 2, 1999
Appl. No.: 08/811,848
Filed: Mar. 5, 1997

(51) Int. Cl.$^7$ .................................................. B60G 1/00

(52) U.S. Cl. ................................. 280/124.125; 180/905

(58) Field of Search ................................. 180/348, 905; 280/81.6, 86.5, 124.157, 124.158, 683

(56) References Cited

U.S. PATENT DOCUMENTS

| 3,340,946 | * | 9/1967 | Whitehead | 280/683 |
| 4,202,564 | * | 5/1980 | Strader | 280/124.158 |
| 5,505,482 | * | 4/1996 | VanDenberg | 280/86.5 |

OTHER PUBLICATIONS

Drawing No. D–20315, dated Aug. 5, 1992, entitled Axle, Pusher Self Steer.

* cited by examiner

*Primary Examiner*—Kenneth R. Rice (57) ABSTRACT

An improved steerable suspension system provides light weight and ease of assembly. In a preferred embodiment, a steerable suspension system has a device attached to opposite ends of a tubular axle. The device includes a number of interconnected plates which cooperate to form an axle seat, and to which a king housing portion is attached.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 17–19 is confirmed.

Claims 1–16 are cancelled.

* * * * *

(12) EX PARTE REEXAMINATION CERTIFICATE (5586th)
United States Patent
Chalin (10) Number: US 5,865,452 C2
(45) Certificate Issued: Oct. 24, 2006

(54) STEERABLE SUSPENSION SYSTEM

(75) Inventor: Thomas N. Chalin, Garland, TX (US)

(73) Assignee: Watson & Chalin Manufacturing, Inc., McKinney, TX (US)

Reexamination Request:
No. 90/006,561, Mar. 10, 2003
No. 90/006,615, Apr. 30, 2003

Reexamination Certificate for:
Patent No.: 5,865,452
Issued: Feb. 2, 1999
Appl. No.: 08/811,848
Filed: Mar. 5, 1997

Reexamination Certificate C1 5,865,452 issued Feb. 27, 2001

(51) Int. Cl.
*B60G 1/00* (2006.01)

(52) U.S. Cl. .............................. 280/124.125; 180/905; 280/93.512

(58) Field of Classification Search .......... 280/124.128, 280/124.125, 93.504, 93.511, 93.512, 683, 280/81.5; 180/905, 253; 301/124.1, 131, 301/132
See application file for complete search history.

(56) References Cited

U.S. PATENT DOCUMENTS

| | | | | |
|---|---|---|---|---|
| 2,411,836 A | * | 11/1946 | Seckel | ........................ 280/80.1 |
| 2,566,565 A | | 9/1951 | Hill | |
| 3,423,104 A | * | 1/1969 | Beach et al. | ........... 280/93.512 |
| 3,695,628 A | | 10/1972 | Fisher | |
| 4,427,089 A | | 1/1984 | Peterson | |
| 5,364,113 A | | 11/1994 | Goertzen | |
| 5,429,423 A | | 7/1995 | Pollock | |
| 5,741,027 A | | 4/1998 | Stroh et al. | |

OTHER PUBLICATIONS

Drawing No. D–20315, dated Aug. 5, 1992, entitled Axle, Pusher Self Steer.
Hendrickson Drawing No. D–11263.

* cited by examiner

*Primary Examiner*—Ruth Ilan (57) ABSTRACT

An improved steerable suspension system provides light weight and ease of assembly. In a preferred embodiment, a steerable suspension system has a device attached to opposite ends of a tubular axle. The device includes a number of interconnected plates which cooperate to form an axle seat, and to which a king housing portion is attached.

ID US 5,865,452 C2

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 6, lines 11–21:

The king pin 162 is pivotably secured to a spindle yoke 164 above and below the king pin housing portion 130. *As depicted in FIG. 5, the spindle yoke 164 also straddles the top plate 134 and the outer plate 136.* A generally horizontally extending spindle 166 extends outwardly from the spindle yoke 164. The spindle 166 provides for attachment of wheel bearings, wheel hub, etc. (not shown), thereto in a conventional manner. The spindle yoke 164 and spindle 166 rotate about the king pin 162, thereby also permitting a wheel (not shown) attached to the spindle to rotate about the king pin and allowing a vehicle on which the steerable axle system 160 is installed to change its direction of travel.

AS A RESULT OF REEXAMINATION, IT HAS BEEN DETERMINED THAT:

Claims 1–16 were previously cancelled.

Claim 17 is cancelled.

Claim 18 is determined to be patentable as amended.

Claim 19, dependent on an amended claim, is determined to be patentable.

New claims 20–63 are added and determined to be patentable.

18. [The steerable suspension system according to claim 17] *A steerable suspension system, comprising:*
  *a generally tubular axle having opposite ends; and*
  *a device attached to each of said axle opposite ends, said device including a king pin housing configured for receipt of a king pin therein, an axle seat complementarily shaped relative to said axle, and a plurality of interconnected plates, said plates being attached to said king pin housing and said axle,*
  wherein said plurality of plates includes first and second side plates and an inner plate, said inner plate having a profile formed thereon, said profile being complementarily shaped relative to said axle, and said first and second side plates and said profile cooperating to form said axle seat.

20. *A steerable suspension system, comprising:*
  *a generally tubular axle having opposite ends; and*
  *a device attached to each of said axle opposite ends, said device including a king pin housing configured for receipt of a king pin therein, an axle seat complementarily shaped relative to said axle, and a plurality of separately formed plates interconnected to each other, said plates being attached to said king pin housing and said axle,*
  *wherein a spindle yoke outwardly straddles the king pin housing.*

21. *The suspension system according to claim 20, wherein a spindle is rigidly attached to the spindle yoke.*

22. *The suspension system according to claim 21, wherein the spindle is fixed relative to a control arm attached to the spindle yoke.*

23. *The suspension system according to claim 22, wherein the control arm is attached to the spindle yoke external to the device.*

24. *A steerable suspension system, comprising:*
  *a generally tubular axle having opposite ends; and*
  *a device attached to each of said axle opposite ends, said device including a king pin housing configured for receipt of a king pin therein, an axle seat complementarily shaped relative to said axle, and a plurality of separately formed plates interconnected to each other, said plates being attached to said king pin housing and said axle,*
  *wherein the interconnected plates form a generally hollow enclosure.*

25. *The suspension system according to claim 24, wherein the axle seat is formed at an opening of the enclosure.*

26. *The suspension system according to claim 25, wherein engagement of the axle with the axle seat closes off the opening.*

27. *A steerable suspension system, comprising:*
  *a generally tubular axle having opposite ends; and*
  *a device attached to each of said axle opposite ends, said device including a king pin housing configured for receipt of a king pin therein, an axle seat complementarily shaped relative to said axle, and a plurality of interconnected plates, said plates being attached to said king pin housing and said axle,*
  *wherein the interconnected plates form a generally hollow enclosure,*
  *wherein the axle seat is formed at an opening of the enclosure,*
  *wherein engagement of the axle with the axle seat closes off the opening, and*
  *wherein the plates include an outer plate which closes off an end of the axle.*

28. *A steerable suspension system, comprising:*
  *a generally tubular axle having opposite ends; and*
  *a device attached to each of said axle opposite ends, said device including a king pin housing configured for receipt of a king pin therein, an axle seat complementarily shaped relative to said axle, and a plurality of interconnected plates, said plates being attached to said king pin housing and said axle,*
  *wherein a single one of the king pin extends from a spindle yoke above the king pin housing to the spindle yoke below the king pin housing.*

29. *A steerable suspension system, comprising:*
  *a generally tubular axle having opposite ends; and*
  *a device attached to each of said axle opposite ends, said device including a king pin housing configured for receipt of a king pin therein, an axle seat complementarily shaped relative to said axle, and a plurality of* interconnected plates, said plates being attached to said king pin housing and said axle, wherein the king pin housing is separately formed from the plates, and wherein the plates include two side plates, a top plate and an outer plate, each of which is attached to the king pin housing.

30. The suspension system according to claim 29, wherein a spindle yoke straddles the top plate and the outer plate.

31. The suspension system according to claim 30, wherein the king pin housing extends between an upper end of the spindle yoke positioned above the top plate to a lower end of the spindle yoke positioned below the outer plate.

32. The suspension system according to claim 30, wherein a spindle is rigidly attached to the spindle yoke.

33. The suspension system according to claim 29, wherein the outer plate closes off an end of the axle.

34. The suspension system according to claim 29, wherein the axle seat is formed at least in part by interior surfaces of the side plates.

35. The suspension system according to claim 34, wherein the axle seat is further formed by a profile formed on one of the plates.

36. The suspension system according to claim 35, wherein the profile is formed on an inner plate.

37. The suspension system according to claim 36, wherein the inner plate is attached to each of the side plates.

38. The suspension system according to claim 37, wherein the inner plate is further attached to the top plate.

39. The suspension system according to claim 36, wherein the inner plate forms at least a first portion of a bracket for a pivoting suspension arm.

40. The suspension system according to claim 39, wherein a second portion of the bracket is attached to the axle.

41. The suspension system according to claim 39, wherein a second portion of the bracket is attached to the top plate.

42. The suspension system according to claim 39, wherein the suspension arm is an upper one of two arms pivotably attached at each end of the axle, the bracket pivotably attaching the upper arm to the axle.

43. The suspension system according to claim 39, wherein the suspension arm is a lower one of two arms pivotably attached at each end of the axle, the bracket pivotably attaching the lower arm to the axle.

44. The suspension system according to claim 39, wherein an actuator is positioned to apply a force to a portion of the arm, to thereby raise the axle.

45. A steerable suspension system, comprising:

a generally tubular axle having opposite ends; and a device attached to each of said axle opposite ends, said device including a king pin housing configured for receipt of a king pin therein, an axle seat complementarily shaped relative to said axle, and a plurality of interconnected plates, said plates being attached to said king pin housing and said axle, wherein the axle is generally square-shaped, wherein the axle seat at least partially outwardly surrounds the axle, and wherein the axle seat is formed at least in part by a generally square-shaped profile formed on the plates.

46. A steerable suspension system, comprising:

a generally tubular axle having opposite ends; and a device attached to each of said axle opposite ends, said device including a king pin housing configured for receipt of a king pin therein, an axle seat complementarily shaped relative to said axle, and a plurality of interconnected plates, said plates being attached to said king pin housing and said axle, wherein the axle is generally square-shaped, and wherein the axle seat is formed at least in part by a generally square-shaped profile formed on a single one of the plates.

47. A steerable suspension system, comprising:

a generally tubular axle having opposite ends; and a device attached to each of said axle opposite ends, said device including a king pin housing configured for receipt of a king pin therein, an axle seat complementarily shaped relative to said axle, and a plurality of interconnected plates, said plates being attached to said king pin housing and said axle, wherein the axle is generally square-shaped, and wherein the axle seat is formed at least in part by a generally square-shaped profile formed on an inner one of the plates.

48. A steerable suspension system, comprising:

a generally tubular axle having opposite ends; and a device attached to each of said axle opposite ends, said device including a king pin housing configured for receipt of a king pin therein, an axle seat complementarily shaped relative to said axle, and a plurality of interconnected plates, said plates being attached to said king pin housing and said axle, wherein the axle is generally square-shaped, wherein the axle seat is formed at least in part by a generally square-shaped profile formed on the plates, and wherein the axle seat is formed at least in part by at least one of the plates which overlies at least one substantially vertical outer side surface of the square-shaped axle.

49. The suspension system according to claim 46, wherein the at least one of the plates are side plates, each of which overlies an opposing outer side surface of the square-shaped axle.

50. A steerable suspension system, comprising:

a generally tubular axle having opposite ends; and a device attached to each of said axle opposite ends, said device including a king pin housing configured for receipt of a king pin therein, an axle seat complementarily shaped relative to said axle, and a plurality of interconnected plates, said plates being attached to said king pin housing and said axle, wherein the axle seat is formed at least in part by the plates overlying opposing vertical outer side surfaces of the axle.

51. The suspension system according to claim 50, wherein the opposing outer side surfaces of the axle are flat.

52. A steerable suspension system, comprising:

a generally tubular axle having opposite ends; and a device attached to each of said axle opposite ends, said device including a king pin housing configured for receipt of a king pin therein, an axle seat complementarily shaped relative to said axle, and a plurality of interconnected plates, said plates being attached to said king pin housing and said axle, wherein the king pin is pivotably secured to a spindle yoke above and below the king pin housing.

53. The suspension system according to claim 52, wherein a spindle is rigidly attached to the spindle yoke.

54. A steerable suspension system, comprising:

a generally tubular axle having opposite ends; and a device attached to each of said axle opposite ends, said device including a king pin housing configured for receipt of a king pin therein, an axle seat complementarily shaped relative to said axle, and a plurality of interconnected plates, said plates being attached to said king pin housing and said axle, wherein the king pin is a single king pin pivotably secured to a spindle yoke above and below the king pin housing.

55. A steerable suspension system, comprising:

a generally tubular axle having opposite ends; and a device attached to each of said axle opposite ends, said device including a king pin housing configured for receipt of a king pin therein, an axle seat complementarily shaped relative to said axle, and a plurality of interconnected plates, said plates being attached to said king pin housing and said axle, wherein the suspension system further comprises a pivoting connection between the plates and at least one suspension arm at each end of the axle.

56. The suspension system according to claim 55, wherein the suspension arm is one of two pivotably attached to the plates at each end of the axle.

57. The suspension system according to claim 55, wherein the pivoting connection is secured on one side to the plates and on an opposite side to the axle.

58. The suspension system according to claim 55, wherein the pivoting connection is secured to the plates on opposite sides of the pivoting connection.

59. The suspension system according to claim 55, wherein the suspension arm is attached to the axle by the device.

60. A steerable suspension system, comprising:

a generally tubular axle having opposite ends; and a device attached to each of said axle opposite ends, said device including a king pin housing configured for receipt of a king pin therein, an axle seat complementarily shaped relative to said axle, and a plurality of interconnected plates, said plates being attached to said king pin housing and said axle, further comprising at least one suspension arm pivotably attached at each end of the axle, the device being interconnected between the suspension arm and the axle.

61. The suspension system according to claim 60, wherein the suspension arm is one of two pivotably attached at each end of the axle.

62. The suspension system according to claim 60, wherein the suspension arm is pivotably connected to the plates.

63. The suspension system according to claim 62, further comprising a fastener which extends through the suspension arm and through an opening formed through one of the plates.

* * * * *